United States Patent Office 3,517,599
Patented June 30, 1970

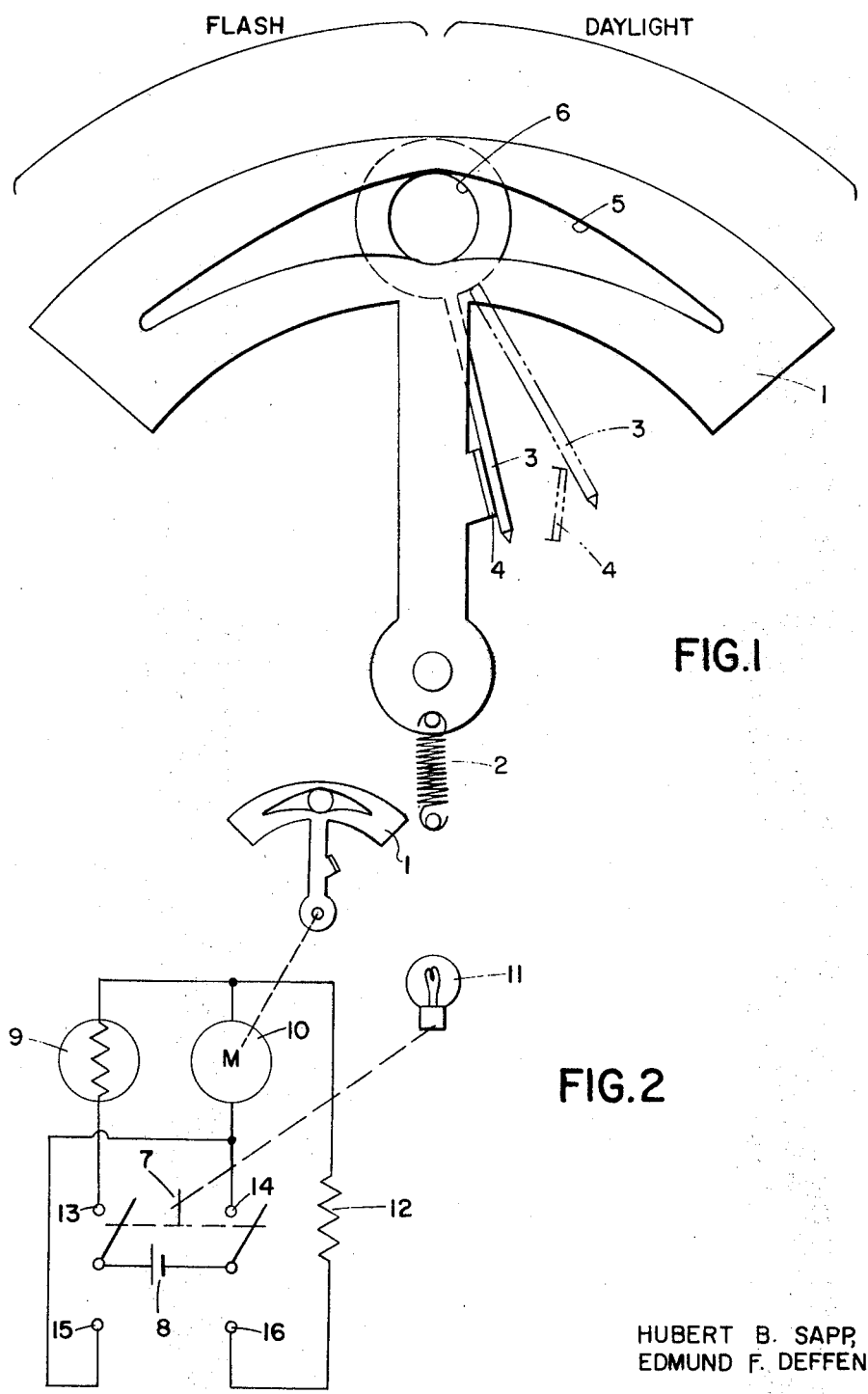

3,517,599
FLASH AND DAYLIGHT EXPOSURE CONTROL
Hubert Beard Sapp, Jr., and Edmund F. Deffenbaugh, Rochester, N.Y., assignors to Eastman Kodak Company, Rochester, N.Y., a corporation of New Jersey
Filed Sept. 25, 1967, Ser. No. 670,075
Int. Cl. G03b 9/02
U.S. Cl. 95—64                5 Claims

ABSTRACT OF THE DISCLOSURE

An exposure control is provided in which the diaphragm opening is controlled by an actuator which has the ability to mave in either of two directions from a rest position. When the actuator is moved in a first direction, the diaphragm opening is changed in accordance with the level of illumination of the scene to be photographed. When the actuator is moved in a second direction, the diaphram opening is determined by the distance from the camera to the subject which determines the correct exposure when using on-camera flash.

BACKGROUND OF THE INVENTION

In a camera which automatically adjusts itself in accordance with the light level of the scene to be photographed, there is a problem when taking flash pictures since the camera, when using on-camera flash, must expose the film in accordance with the lamp-to-subject distance which, when using an on-camera flash, is the camera-to-subject distance. In the prior art, it is taught that when a flash bulb is inserted, a mechanism may be actuated which transfers the exposure regulating member from control by the photoelectric responsive device to control by the focusing device. Systems of this type, although workable, have been complicated and expensive to manufacture.

SUMMARY OF THE INVENTION

It is therefore an object of the invention to provide a photographic camera which is adapted to photograph by flash illumination and which is adapted to do so while automatically adjusting itself for correct exposure.

It is a further object of the invention to provide a photographic camera in which both flash and daylight photography can be accomplished automatically.

These and other objects of the invention are accomplished by providing an exposure control that varies from a center position; i.e., when the exposure control is in its center position, it is at one end of its scale, and it deflects from this center position to either end to give the other extreme in its scale. The exposure control is driven by a transducer whose polarity of energization is switched by the insertion of a flash bulb. When no flashbulb is inserted, the exposure control moves in one direction, and operates in accordance with the the amount of illumination of the scene. When a flashbulb is inserted, the exposure control tends to go to its extreme opposite direction, and is limited only by the setting of the focus control.

BRIEF DESCRIPTION OF THE DRAWING

Further objects will become apparent from the following description, particularly when considered in the light of the accompanying drawing wherein:

FIG. 1 is a diagrammatic view of a diaphragm together with its mechanism for limiting its travel with respect to focus; and FIG. 2 is a circuit diagram of the switching arrangement for switching from flash to daylight exposure and vice versa.

DESCRIPTION OF THE PREFERRED EMBODIMENT

Referring to FIG. 1, there is shown a diaphragm blade 1 which has an aperture 5 as shown. The diaphragm is biased toward its center position by spring 2. This center position presents the largest portion of aperture 5 to exposure aperture 6. When the diaphragm is moved to either side of the center position, the amount of exposure aperture 6 which is exposed is decreased. Diaphragm 1 is coupled to a transducer which is movable in either direction from center. This type of transducer is well known and is not shown. When the transducer is energized with one polarity, the diaphragm will move to the left an amount determined by the amount of current passing through the transducer. In this mode the system operates according to the amount of scene illumination. When the transducer is energized with the opposite polarity, the diaphragm will move to the right, as viewed in FIG. 1, until lug 4 comes in contact with pointer 3, whose position is determined by the position of the camera focus control. Pointer 3 pivots around an axis which runs through the center of the exposure aperture. It is coupled to the focus adjustment so that as the focusing distance gets shorter, the pointer moves more and more to the right.

Referring to FIG. 2, there is shown a photoconductive cell 9 which is electrically coupled to transducer 10. When double-pole, double-throw switch 7 is in the position which connects the battery to terminals 13 and 14, a series circuit consisting of battery 8, photoconductor 9, and transducer 10 is completed so that the transducer is energized in accordance with the amount of light falling on photoconductive cell 9 in a manner which is well known. When a flashbulb is inserted into its holder, double-pole, double-throw switch 7 is moved to a position which connects the battery to terminals 15 and 16. This takes photoconductor 9 out of the circuit and now makes a series circuit of transducer 10, resistor 12 and battery 8. It is to be noted that when the switch 7 is contacting terminals 15 and 16, the transducer is oppositely energized from the way it was energized when the photoconductor was in the circuit. Therefore, the current through transducer 10 is limited only by the resistance of resistor 12.

When it is desired to take pictures by daylight, there is no flashbulb in the flash holder and thus switch 7 is connected to terminals 13 and 14. Transducer 10 is therefore energized so that diaphragm 1 deflects to the left. The deflection of diphragm 1 is dependent upon the amount of light falling on photoconductor 9: the more light falling on photoductor 9, the farther diaphram 1 will deflect.

However, when a flashbulb is inserted into the flash holder, thus switching double-pole, double-throw switch 7 from terminals 13 and 14 to terminals 15 and 16, transducer 10 is energized in the opposite direction. The amount of its energization is determined by the value of resistor 12 which is proportioned so that, with no impediment, diaphragm 1 will be deflected all the way to the right. The diaphragm is blocked, however, by pointer 3 whose position is determined by the focus setting on the camera. When the camera is focused for a long distance, the diaphragm will be limited to its maximum aperture, whereas as the focusing distance gets closer to the camera, the diaphragm will be stopped down further. In this way, a simple system is provided where automatic exposure is available for both flash and daylight exposure.

Although the preferred embodiment has been shown using a diaphragm having a large aperture in its center with minimum apertures at either end, it is within the contemplation of the invention to use a prior art type of diaphragm with a differential type of drive wherein, when the transducer is moved either direction from a center point, the diaphragm will be stopped down in a single direction. Furthermore, the invention is not limited to a flash exposure limiting member which is a pin which pivots around an axis through the exposure aperture; any stopping member could be used which is coupled to the focus setting device. Additionally, it is within the contemplation of the invention to use any light sensitive cell for control of the circuit while making any other changes that are appropriate. The invention is not limited to the use of a CdS cell.

The invention has been described in detail with particular reference to a preferred embodiment thereof, but it will be understood that variations and modifications can be effected within the spirit and scope of the invention.

We claim:

1. An automatic exposure control apparatus for a camera which is adapted to photograph a scene using either illumination from a flash apparatus or ambient illumination, said camera having a movable exposure control member, said flash apparatus having a connector for cooperation with the camera, said exposure control apparatus comprising:
   a photocell adapted to be exposed to illumination from the scene being photographed,
   a reversing switch actuatable by the connection of the flash apparatus to the camera and electrically coupled to said photocell,
   transducer means for driving the movable exposure control member, said transducer means being electrically coupled to said reversing switch and being selectively electrically coupled to said photoelectric cell by said reversing switch,
   means for rendering said reversing switch effective to couple said transducer to said photocell and to energize said transducer in a first polarity when said flash apparatus is disconnected from the camera, and to energize said transducer in a second polarity when said flash apparatus is connected to the camera, and
   means for limiting the travel of said transducer when the connection of a flash apparatus causes said reversing switch to be actuated.

2. An exposure control apparatus as in claim 1 in which the camera comprises a focus control, and wherein said limiting member is coupled to the focus control whereby when a flash apparatus is connected, the exposure is regulated according to the setting of the focus control.

3. An exposure control as in claim 1 wherein said exposure regulating member includes:
   a diaphragm having an opening which is largest at the center, and decreases in size to either side of center.

4. An automatic exposure control apparatus for a camera adapted to photograph a scene either with or without illumination from a flash apparatus, said camera having a movable exposure control member and a movable focus control member, said exposure control apparatus comprising:
   a photocell adapted to be exposed to illumination from the scene being photographed,
   transducer means for driving said exposure control member,
   reversing switch means having first and second positions for energizing said transducer in a first polarity when said reversing switch is in said first position, and for energizing said transducer in a second polarity opposite to said first polarity when said reversing switch is in said second position,
   means for coupling said photocell in circuit with said transducer when said reversing switch is in said first position, and
   means for limiting the travel of said transducer in accordance with the position of said focus control member when said reversing switch is in said second position, so as to give proper exposure when photographing by flash illumination.

5. An automatic exposure control apparatus as in claim 4, further comprising:
   means for connecting said camera to a flash apparatus, and
   means for switching said reversing switch from said first position to said second position in response to connection of said flash apparatus to said camera.

References Cited

UNITED STATES PATENTS

| | | | |
|---|---|---|---|
| 3,072,028 | 1/1963 | Lange | 95—10 |
| 3,173,350 | 3/1965 | Steisslinger | 95—10 XR |
| 3,270,650 | 9/1966 | Ernisse | 95—10 XR |
| 3,291,022 | 12/1966 | Brown | 95—10 XR |

NORTON ANSHER, Primary Examiner

D. S. STALLARO, Assistant Examiner

U.S. Cl. X.R.

95—10